Nov. 9, 1954
W. OPP ET AL
2,693,781
IRRIGATION SIGNAL
Filed Oct. 11, 1952
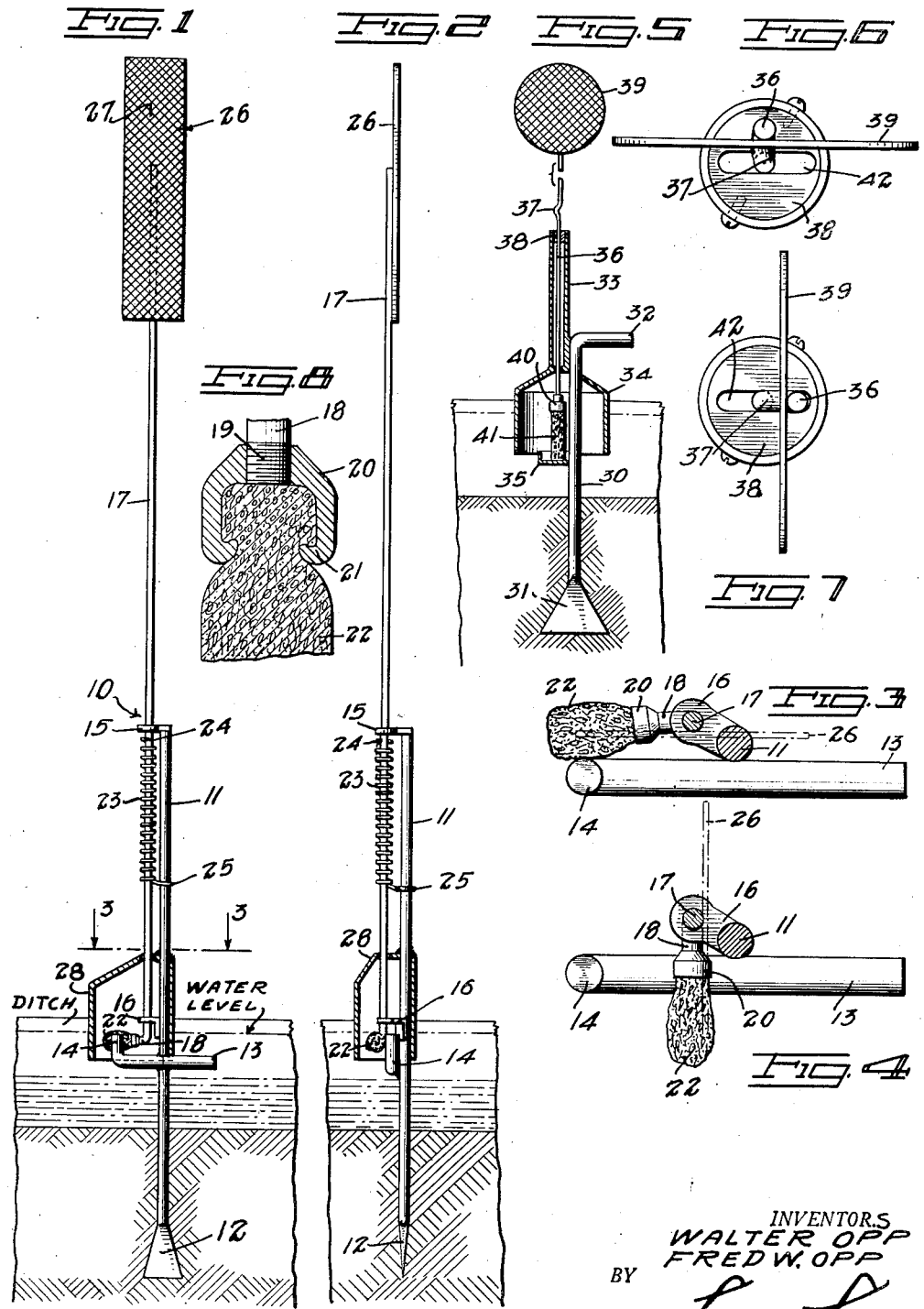
INVENTORS
WALTER OPP
FRED W. OPP
BY
Lyon & Lyon
ATTORNEYS 2,693,781
Patented Nov. 9, 1954

2,693,781
IRRIGATION SIGNAL

Walter Opp, Altadena, and Fred W. Opp, Costa Mesa, Calif.

Application October 11, 1952, Serial No. 314,348

7 Claims. (Cl. 116—118)

This invention relates to an irrigation signal and, more particularly to a device adapted to be positioned in an irrigation ditch to signal to the farmer when the water level has reached the point in the ditch at which the signal is placed.

There has long been a need for a device which would tell the farmer, particularly those employed in flood irrigation, when the water in an irrigation ditch had reached a desired point. Many expedients have been resorted to, such as the use of field glasses and the like, and various proposals have been made for the use of floats and other devices. However, none of these devices have gone into practical use.

It is, accordingly, one object of our invention to present a device for signalling to the farmer when the desired water level has reached the point in an irrigation ditch where the signal is located and thus avoid the necessity of the farmer walking the full length of his irrigation ditch to inspect the same.

It is a further object of our invention to provide such a device which is simple and durable of construction.

It is a further object of this invention to provide a device of the type described which, after being once used, can be reset without the necessity of replacing any expended elements.

It is a further object of this invention to make use of the ability of certain materials, such as sponges, to present considerable tension or compression strength when dry, but to become very weak when wet so that in the dry state, the sponge is capable of maintaining the signal in the "off" position and, yet, when wet, yielding to permit the signal to pass to the "on" position.

These and other objects and advantages of this invention will be apparent from the annexed specification in which:

Figure 1 is a front elevation of our improved irrigation signal.

Figure 2 is a side elevation of the device shown in Figure 1.

Figure 3 is a horizontal section taken on the line 3—3 of Figure 1 with the hood removed for clarity of illustration, showing the sponge element dry.

Figure 4 is a view similar to Figure 3 showing the action when the sponge is wet.

Figure 5 is a front view, partly in section, of an alternative embodiment of the present invention.

Figure 6 is an enlarged top view of the device shown in Figure 5.

Figure 7 is a view similar to Figure 6 showing the device in signalling position.

Figure 8 is an enlarged section of the sponge-holding socket.

Referring now more particularly to the drawings, there is illustrated in Figures 1–4 a signalling device indicated generally by the numeral 10. The device includes a rod 11 having a flattened and flared ground-contacting foot 12 adapted to be driven into the soil in an irrigation ditch as shown. The rod 11 has welded thereto a crossarm 13 having an upstanding leg 14.

The rod 11 also has welded thereto a pair of brackets 15 and 16 which are bored to rotatably receive a rod 17. The rod 17 has a horizontally turned leg 18 which is threaded as at 19 to receive a socket 20. The socket 20 is provided with an inturned flange 21 to retain a sponge element 22.

A coiled spring 23 is wound about the rod 17 and has one end affixed thereto as at 24 and the other end affixed to the rod 11 as at 25.

The upper end of the rod 17 carries a signal 26 which, as shown in Figures 1 and 2, is a thin rectangular sheet of metal, preferably provided with a highly reflecting surface 27; in fact, we prefer to make the surface 27 of a phosphorescent material to enable easy location thereof by spotlight at night.

A hood 28 is provided, affixed to the shaft 11 and substantially surrounding the sponge element 22 to shield the same from rain, dew and the like.

The operation of the above described device is as follows: when the same is placed in the ditch as shown in Figure 1, the operator, by placing his foot upon the arm 13, will drive the device into the ground to a point where the sponge element 22 is located at the level to which it is desired that the irrigation water will reach. When placed as thus described, the operator will then turn the rod 17 so as to place the coil spring under tension with the sponge 22 firmly engaging the upstanding leg 14. It will be appreciated that when the sponge element 22 is dry it has sufficient strength to hold the rod 17 in this position, the sponge 22 being urged firmly against the leg 14 under the bias of the spring 23. When the water reaches the sponge 22, the sponge, having a very low wet strength, becomes soft and easily deformed. When this condition is reached, the low strength sponge 22 collapses and, thus, the rod 17 is turned by the spring 23, forcing the sponge 22 past the leg 14 until the leg 18 comes into contact with the rod 11. In this position the signal 26 is activated and the farmer will know that water has reached the desired point in the ditch.

Referring now to Figures 5–7, there is shown an alternative embodiment of the invention. In this embodiment a rod 30 is provided with a flared and flattened foot 31 and a horizontal leg 32. Attached to the rod 30 is a tube 33, a hood 34 and a platform 35. A rod 36 is disposed having its ends extending from the tube 33 and having towards the upper end of the tube 33 a convolution 37. The upper end of the rod 33 is provided with a member 38 having a slot 42 therein as shown in Figures 6 and 7. The upper end of the rod 36 is provided with a signalling device 39.

The lower end of the rod 36 is threaded to receive a socket 40 similar to the socket 20, which similarly receives the sponge element 41.

The operation of the above described device is as follows: when the device is dry the sponge 41 will have sufficient compression strength to support the rod 36 in the signalling device 39 and, hence, the device will be positioned as shown at 35 where the convolution 37 extends above the member 38. However, when water strikes the sponge 41, the sponge will become soft and flabby and will collapse under the weight of the rod 36 and signalling device 39. As this happens the rod 36 will lower itself through the tube 33 and as the convolution 37 passes through the slot 42, the rod 36 will be turned through 90° as shown in Figures 6 and 7, thus signalling to the farmer that water has reached the desired level in the irrigation ditch.

While there has been described what is deemed the preferred embodiments of the present invention, it will be apparent by those skilled in the art that various changes and modifications can be made therein without departing from the essence of the invention and it is intended to cover herein all such changes and modifications as come within the true spirit and scope of the appended claims.

What is claimed is:

1. An irrigation signal comprising: a standard; an upstanding rod movably mounted on said standard; a signal carried by said rod; a sponge holding and releasing element carried by said rod; means mounted on said standard and being adapted to be engaged by said element; said element having dry strength sufficient to retain said rod and signal in off position but having insufficient wet strength to so retain said rod.

2. A device as set forth in claim 1 in which said element after initial wetting dries to its original dry strength for re-use.

3. An irrigation signal comprising: a standard; an upstanding rod movably mounted on said standard; a signal carried by said rod; a sponge carried by said rod adjacent the lower end thereof; means mounted on said standard and being adapted to be engaged by said sponge; means urging said sponge against said means when said signal is in off position; said sponge being adapted to collapse when wet to actuate said signal.

4. An irrigation signal comprising: a standard; an upstanding rod movably mounted on said standard; a signal carried by said rod; means for rotating said rod on its axis to present different aspects of said signal; a sponge-like member carried by said rod; means on said standard engageable by said sponge member to prevent rotation of said rod; said sponge member being adapted to collapse when wet and permit rotation of said rod.

5. A device as set forth in claim 4 including spring means mounted between said rod and said standard and normally tending to rotate said rod.

6. A device as set forth in claim 4 including brackets forming guides for vertical movement of said rod with respect to said standard; and a convolution in said rod adjacent one of said guides whereby said rod is turned through 90° on its axis on downward movement of said rod accompanying collapse of said sponge member.

7. An irrigation signal comprising: a standard adapted to be driven into the ground; an upstanding rod rotatably mounted on said standard; a signal carried by said rod; spring means mounted between said rod and standard and normally tending to rotate said rod about its axis; a sponge mounted adjacent the bottom of said rod; a stop carried by said standard and engageable by said sponge, when dry, to prevent rotation of said rod, said sponge collapsing when wet to disengage said stop and permit rotation of said rod.

References Cited in the file of this patent

UNITED STATES PATENTS

| Number | Name | Date |
|---|---|---|
| 2,591,037 | Adam | Apr. 1, 1952 |
| 2,607,835 | Bonar | Aug. 19, 1952 |